(12) United States Patent
Lofgren et al.

(10) Patent No.: US 7,722,071 B1
(45) Date of Patent: May 25, 2010

(54) HANDCYCLES

(76) Inventors: Michael Shane Lofgren, 20589 SW. Elkhorn Ct., Tualatin, OR (US) 97062; Brian Charles Stewart, 17915 S. Strowbridge Rd., Oregon City, OR (US) 97045

( * ) Notice: Subject to any disclaimer, the term of this patent is extended or adjusted under 35 U.S.C. 154(b) by 751 days.

(21) Appl. No.: 11/379,513

(22) Filed: Apr. 20, 2006

(51) Int. Cl.
*B62K 5/02* (2006.01)

(52) U.S. Cl. ............... 280/282; 280/250; 280/288.1

(58) Field of Classification Search ............ 280/282, 280/242.1, 249, 250, 288.1
See application file for complete search history.

(56) References Cited

U.S. PATENT DOCUMENTS

| 4,572,535 A | 2/1986 | Stewart et al. |
| 5,354,084 A | 10/1994 | Lofgren et al. |
| 5,853,184 A | 12/1998 | Lofgren et al. |

OTHER PUBLICATIONS

Invacare and Top End handcycles: including but not limited to the XLT Pro, Excellerator, XLT Gold, Gold, Excellerator Junior, Bike-on Signature Edition, XLT Gold.pdf, signature Gold.pdf.
Sopor or Quickie Shark, Quickie Shark.pdf.
Schmicking handcycle, Schmicking.pdf, Schmicking-1.pdf, Schmicking-2.pdf, Schmicking-3.pdf.
Varna handcycles, Varna Kneel Racer.pdf, Varna Longseat.pdf, Varna II.pdf.
Hall's Wheels Defiant handcycle.
Jeff Hopkins, Marine Corps Marathon, Sports 'N Spokes Magazine, Jan. 2006, p. 24, Paralyzed Veterans of America, Phoenix, AZ, 85016.
www.bike-on.com.
Ian Lawless, Championship Action, Sports 'N Spokes Magazine, Sep. 2005, pp. 15 and 16, Paralyzed Veterans of America, Phoenix, AZ, 85016.

*Primary Examiner*—Kevin Hurley (57) ABSTRACT

The present invention encompasses several improvements to handcycles. This invention introduces a blend between lean steer and pivot steer. The front wheel may be turned with only minimal twisting of the operator's legs. This invention uses two bearings and quick release axle to connect the front and rear frame together and provide the steering axis. This invention incorporates a means for adjusting the bike from fully reclined to a body forward position. The invention also incorporates a means of crank adjustment. In the embodiment of our new design the cable and housing are attached to the brake and shift levers by means of an intermediate device for the purpose of directing the shift and brake cable away from the rider's field of view.

5 Claims, 8 Drawing Sheets

HANDCYCLES

FIELD OF THE INVENTION

The following invention incorporates many changes to present day handcycle design. In particular the present invention is directed at low seated performance handcycles where the center of gravity of the rider is necessarily low to allow for high speed cornering. Present day handcycles are essentially of two types of steering design; lean steer utilizing an articulating frame design with the front frame including wheel, cranks and seat articulating relative to the rear frame and the two rear wheels or pivot steer utilizing a standard bicycle headset and front fork arrangement with two rear wheels, a seat that is mounted on the rear frame that does not turn with the steered front frame and a pivoting front frame section including the front wheel and leg supports with pivoting of the front wheel occurring at what is referred to as a head set in bicycle terminology. Both of these handcycles have advantages and disadvantages. The presently available pivot steer handcycles have the steering axis remote from the rider's hip sockets and at substantial distance from the steering axis causing a twisting of the rider's legs when the front steered member of the handcycle is turned left and right because the rider's legs are located in footrests at each side of the front wheel and the great distance from the steering axis to the rider's hip sockets forces a twisting of the rider's legs at the rider's knees. The lean steer handcycle does not present this problem because the rider's legs, hips and upper body move with the turning of the front wheel. Before the present invention, neither type of handcycle had a tight turning radius; the lean steer bike when properly configured has a slightly tighter turning radius than the present pivot steer handcycles. The present invention addresses both of these problems. The present invention has a very tight turning radius and does not twist the rider's legs at the knees.

BACKGROUND ART

There are many handcycles configured with pivot steering and one wheel in front and two wheels in the rear. Some of these types of bikes are listed in the IDS documents. All these bikes have one thing in common that limits the turning radius and twists the rider's knees; the location of the steering axis relative to the rider's hip sockets. In the present design the headset is located on the steering axis as close to the wheel as possible. First the angle of the steering axis is determined and then the required amount of trail to achieve stability. The steering axis extends from its intersection with the road just in front of the contact patch of the front wheel upwardly and rearward towards the back of the bike. After the steering axis and trail are established the headset which is the pivotal junction of the front and rear frame is moved along this axis horizontally and downwardly and is located as close to the back side of the front wheel and tire as possible. In the present invention the seat platform is moved as far forward as possible placing the steering axis as close as comfortably possible to the rider's hip sockets. The result of this close location of headset to front wheel and steering axis to hip socket of the rider is a handcycle with a tight turning radius for excellent maneuverability and the ability to steer the bike without twisting the rider's legs at the knees.

DETAILED DESCRIPTION OF THE INVENTION

Figure 1A:
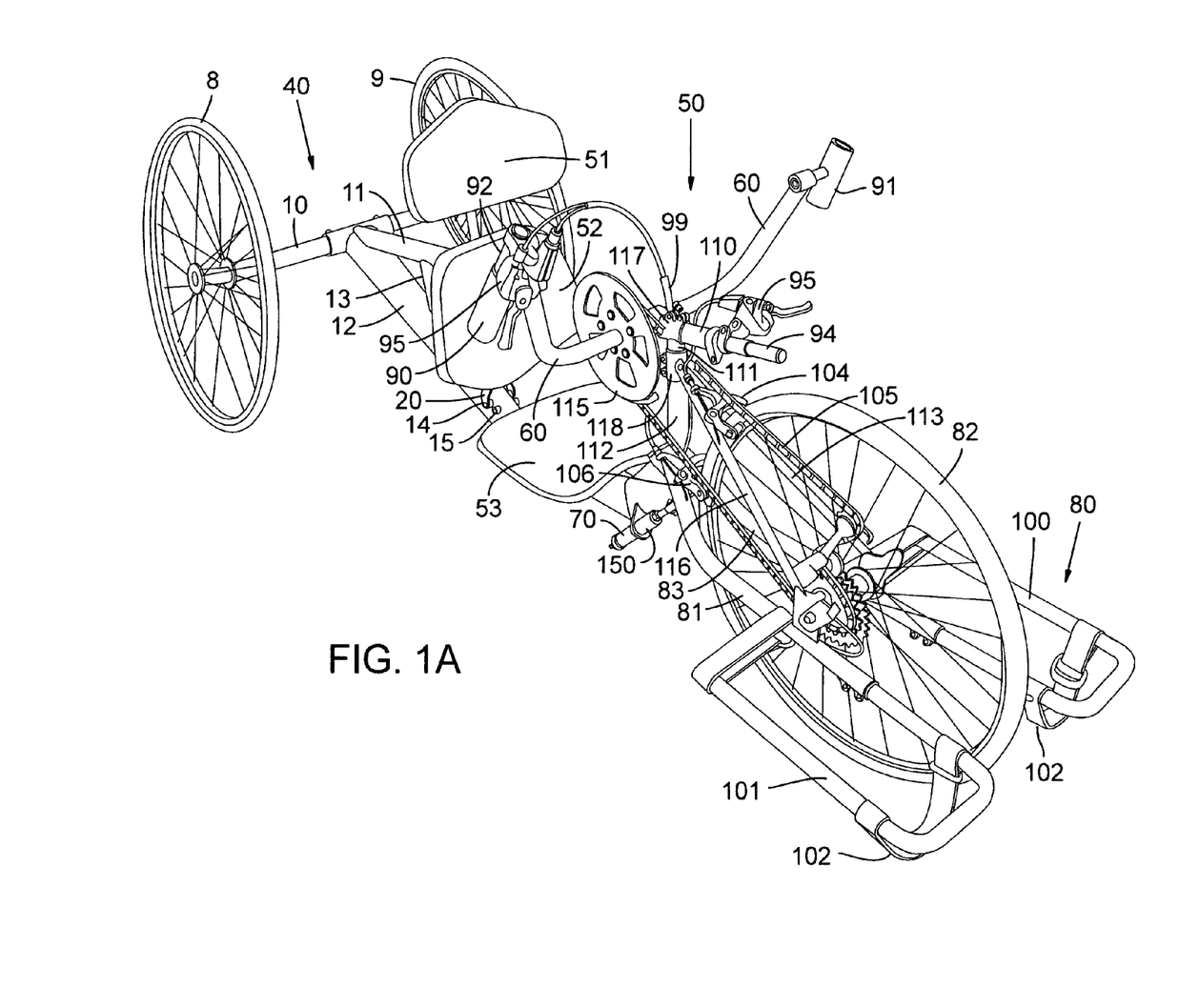
FIG. 1A Perspective drawing of the handcycle.
Figure 1B:
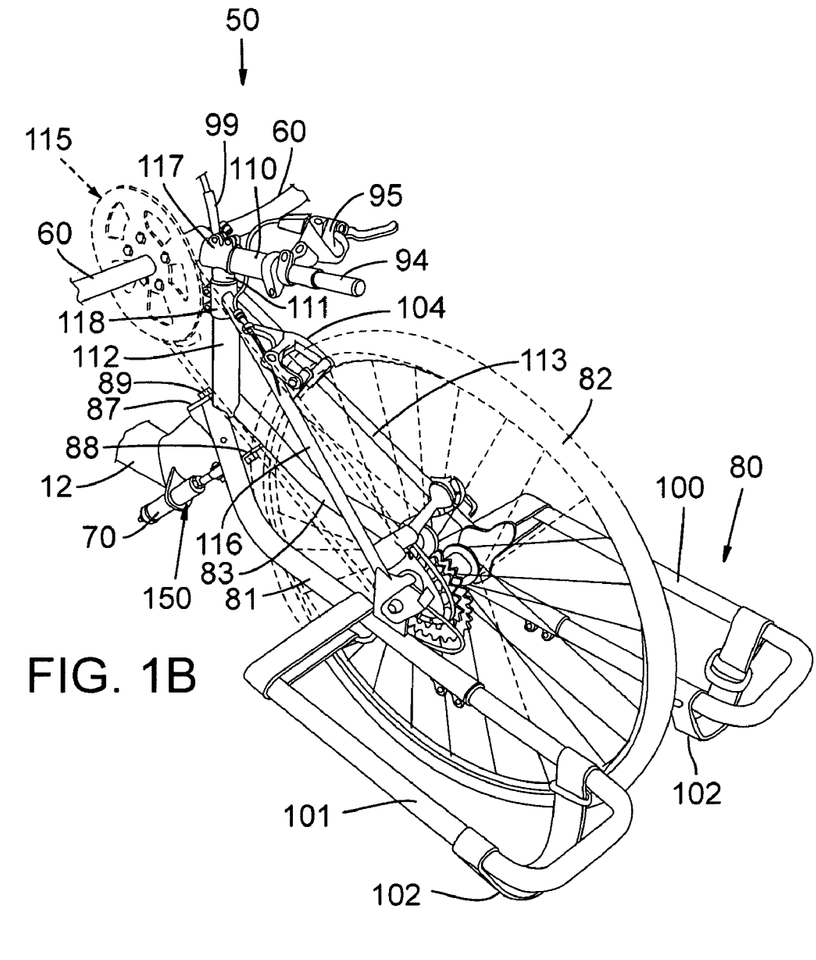
FIG. 1B Perspective drawing of the front frame attachment and front forks.
Figure 4:
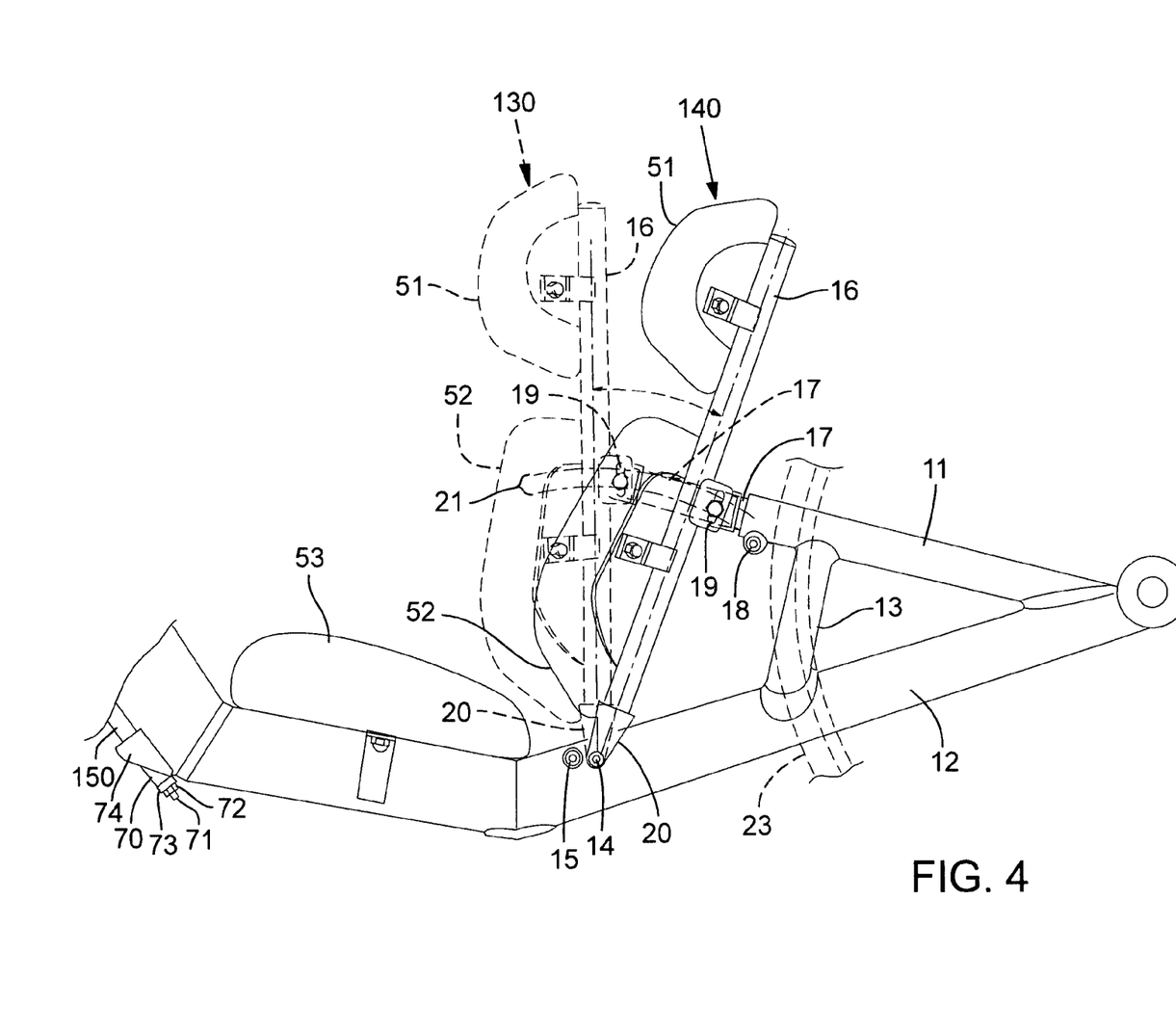
FIG. 4 Side view showing seat back adjustment.
Figure 5:
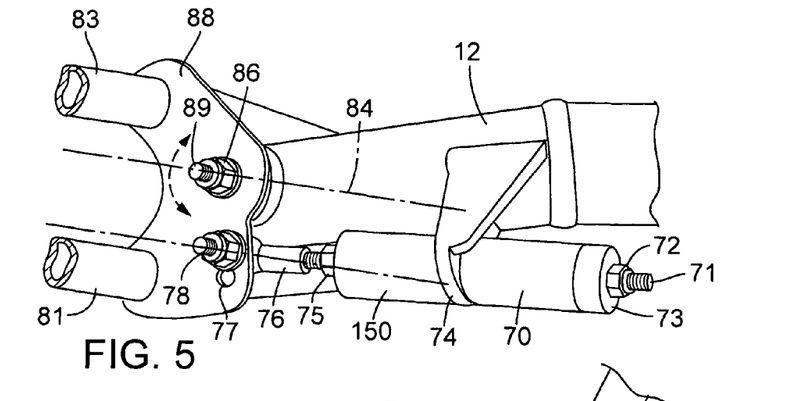
FIG. 5 View of the steering damper and underside of the front frame attachment.
Figure 6:
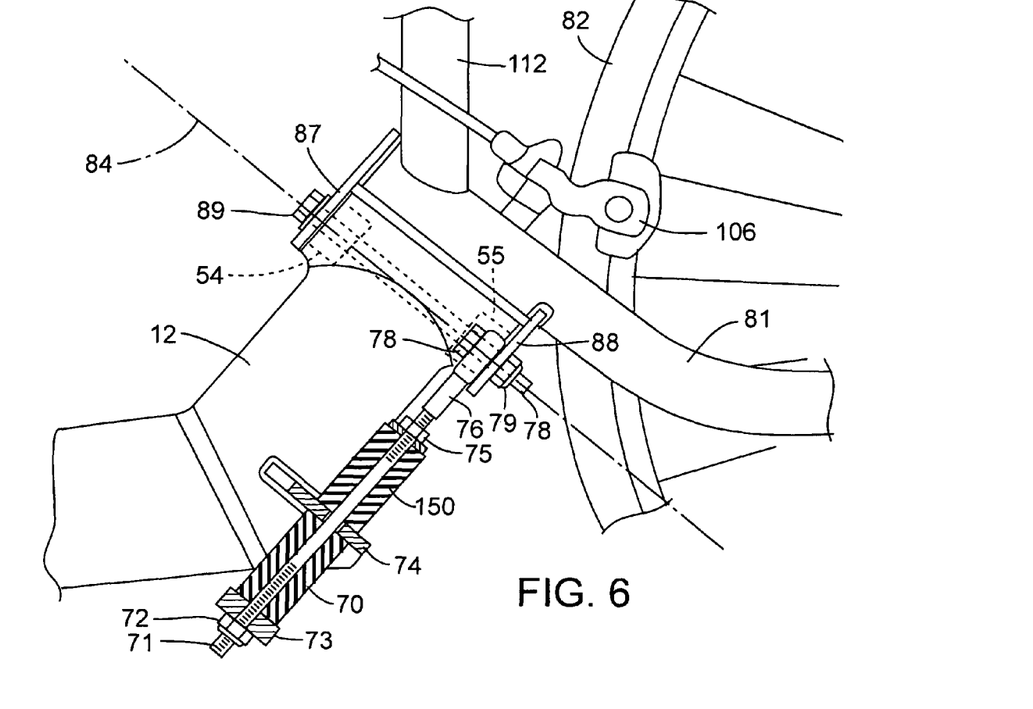
FIG. 6 View of the connection between front and rear frame.

The present invention is a modification of pivot steering and lean steering. The present invention as shown in FIG. 1 and FIG. 1a is differentiated from the other two designs by the location of the front forks 83 and 81 FIG. 5 and FIG. 6 in relation to the steering axis 84 and steering pivot plates 87 and 88 and pivot bolt 89 and the means by which the front frame 80 and rear frame 50 are connected through this steered axis 84 to allow for steering of the vehicle. In the present invention FIG. 1A the joining of the front steered member to the rear frame through steered axis 84 is close to the rider's crotch, the rider's crotch is almost in contact with the front wheel 82 and the steering axis passes through the rider's body resulting in a short wheel base. The front 80 and rear frame 50 are connected by a pivotal axle 89 and bearing arrangements 54 and 55. Pivot steer handcycles use a common bicycle headset to provide a steering axis with the joining of the fork tubes below and in line with the steering axis. Some handcycles have the plane of the front fork tubes offset and above the steering axis but the steering axis passes essentially over the riders' body with the center of gravity of the rider's body below the steered axis. Lean steer handcycles use distantly separated pivot points to form a virtual steering axis that passes through the rider's body. The present invention FIG. 1A incorporates plate 87 and 88 and front fork 83 and front fork 81 that is connected by axle 89 which passes through bearings 54 and 55 located in rear frame 12. This location of the steering axis 84 approximates the handling characteristics of the lean steer handcycle but provides a stable platform for the rider's body by placing the seat bottom 53 on the rear frame 50 and not part of the steered front frame 80 as in a lean steer handcycle. This arrangement of plates 87 and 88 and independent, vertically, adjustable member 111 which moves vertically relative to member 112, FIG. 2A and independent, horizontally adjustable member 110 provide location of the cranks 60 allowing the steering axis 84 to be pulled close to the front wheel axis 120 and front wheel 82. With a head set and fork combination the axis of rotation of the front wheel is forced to be distant from the head set to accommodate the construction of the front forks. In our present invention FIGS. 1, 1A, 2A, 5 and 6 the confluence of the front fork tubes 81 and 83 at plates 87 and 88 is offset from and located above the pivot axis 84 and plate 87 and 88 are attached to rear frame 50 by means of pivot axis bolt 89 passing through bearings 54 and 55. The top of the front fork legs 83 and 81 converge to a single point and are cut off to accept oval shaped plate 87 parallel to plate 88 to allow the rider's legs to pass by each fork 83 and 81 without interfering with the frame structure 80. Our present invention FIG. 1 incorporates the independent horizontal member 110 and independent vertical member 111 to provide the independent vertical and horizontal crank position 115 adjustment described in the earlier Lofgren-Stewart U.S. Pat. No. 5,853, 184 In the present design the base of the crank mounting platform is made of members 81, 83, 112, 113 and 116 for strength as in the '184 patent but the vertical and horizontal adjustments are accomplished by independent, telescoping, essentially horizontal member 110 and vertical member 111. This broad range of vertical and horizontal adjustment FIG. 2A allows the rider to move the crank assembly 115 rearward or forward or up or down to configure the handcycle in either a reclined riding position as indicated in FIG. 4. 140 or a body forward riding position FIG. 4. 130. The vertical adjustment tube 111 is cantilevered above the triangulated support structure comprised of 83, 81, 112, 113 and 116 and the horizontal adjustment tube 110 is cantilevered at approximately a 90 degree angle to the vertical adjustment tube 111 and adjusts forward and rearward relative to the vertical adjustment tube 111 and both adjustments are secured in place by clamps 117 and 118.

Figure 1C:
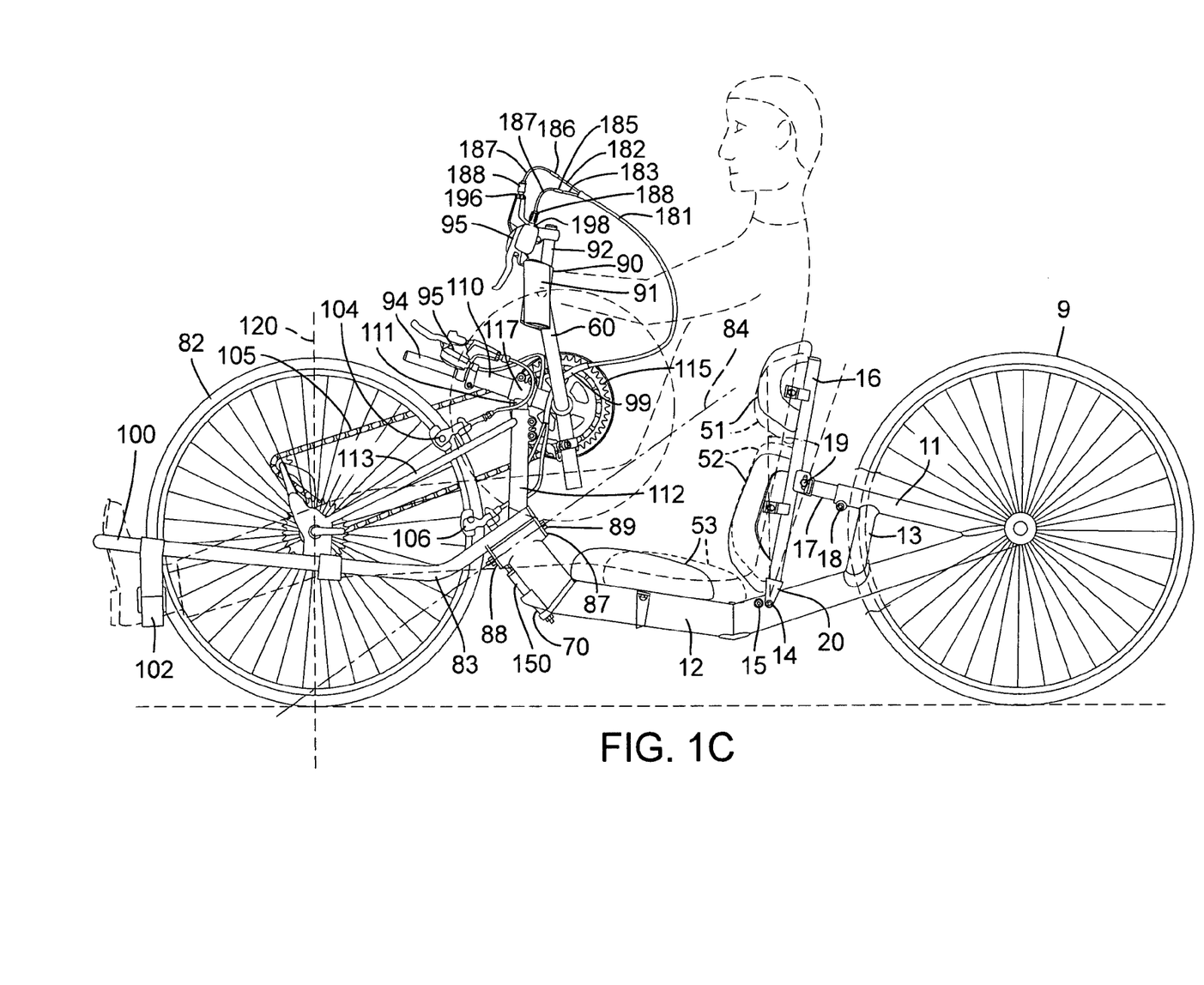
FIG. 1C Left side view of the handcycle with rider phantomed in for reference.
Figure 2A:
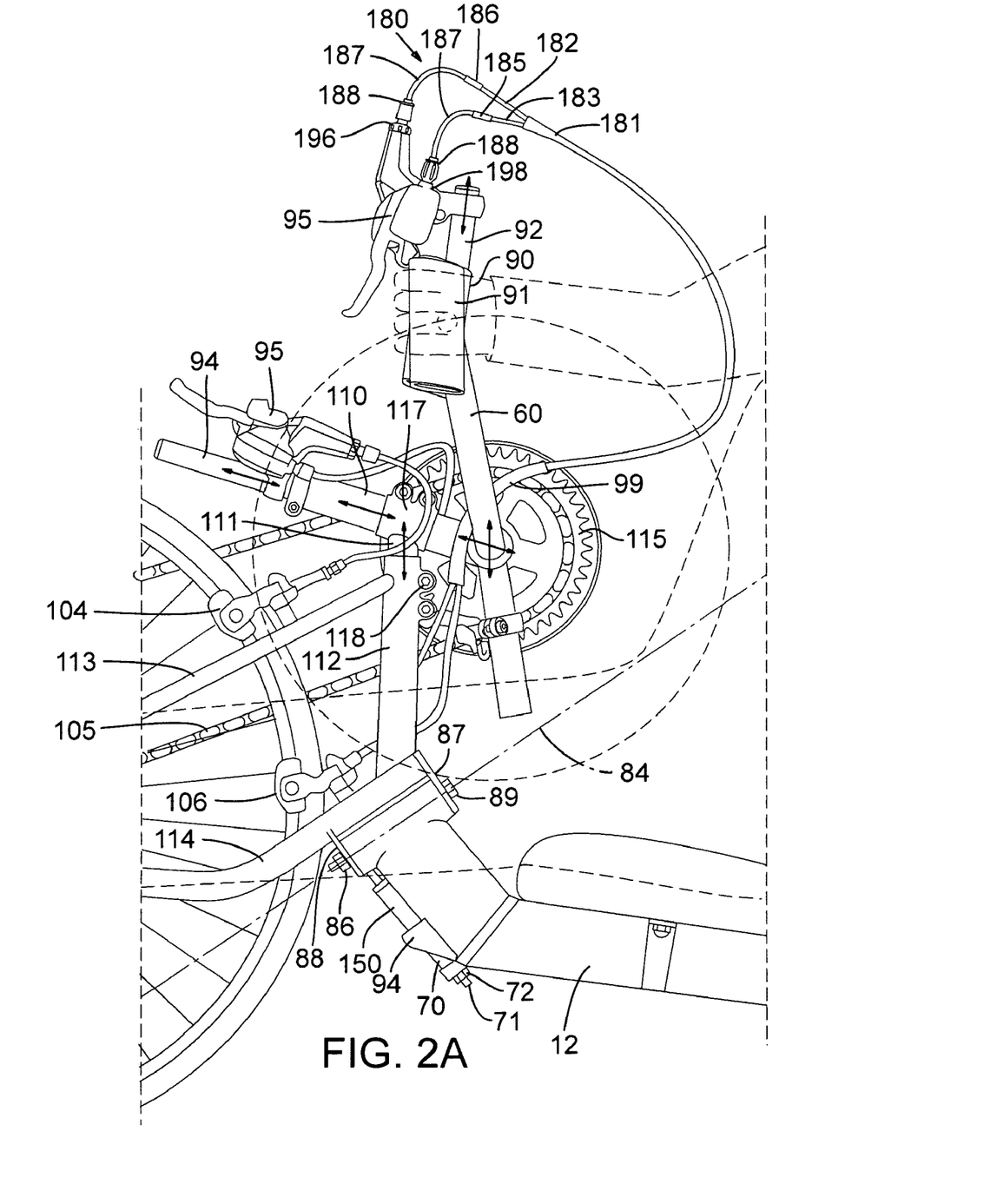
FIG. 2A View of the crank adjustment and shift cable improvement.

This invention FIG. 1 and FIG. 1A incorporates a multi-position seat bottom 53 and seat back 51 and 52 as shown in FIG. 1A and FIG. 4. The seat bottom 53 can be moved forward and rearward FIG. 1C and the seat back support 16 has a base attachment 20 that can be located forwardly at position 15 or rearwardly at position 14 as well as a telescoping member 17 with a slot 19 in the end of member 17 perpendicular to the adjustment axis defined by member 11. Member 11 is rigidly connected to member 12 for the greatest possible frame strength. Because member 11 is rigidly connected to member 12 there must be a slot 19 in both the end of member 17 and the tab on the seat back support 16. This slot 19 allows the seat back 16 to be rotated about one or more different locating points at its base. There is a tab on seat back 16 including a slot 19 in seat back 16 working in conjunction with slot 19 in the end of member 17 to accommodate rotation 21 of member 16 about lower pivot points 14 or 15 when the seat back 51 and 52 is adjusted to any position from reclined 140 to inclined 130 forward of vertical to provide leverage to the rider when in a forward seated position. This slot 19 shown occurs in both the end of member 17 and the tab on seat back support 16 and appears superimposed upon it self in the respective parts; tab on 16 and end of member 17. The invention FIG. 5 and FIG. 6 also incorporates a combined steering damper and steering compensator 150 that incorporates compressed elastomers 69 and 70 for steering damping and road crown compensation. This device 150 also acts as a road crown compensator. The device 150 is comprised of elastomers 70, threaded rod 71, locking nuts 72 and 75, spherical rod end 76 and adjustment knob 73. Device 150 can be rotated about its longitudinal axis defined by threaded rod 71 to preset the steering to compensate for the crown in the road. This is accomplished in the following manner: Threaded rod 71 passes through rear frame 50 with attached tab 74 and attaches to plate 88 of front frame 80 by means of spherical rod end 76 through one of multiple holes 77. Device 150 is rotatable about threaded rod 71 by means of adjustment knob 73. Adjustment knob 73 is threaded and is secured to threaded rod 71 by jamming lock nut 72. Adjustment knob 73, locking nut 72 and threaded rod 71 can be turned in conjunction to pull threaded spherical rod end 76 toward rear frame 50 tab 74 or push spherical rod end 76 away from rear frame 50 tab 74 to preset steering to adjust for road crown. Locking nut 75 can be tightened or loosened relative to lock nut 72 and adjustment knob 73 to increase or decrease compression of elastomers 70 on either side of rear frame 50 tab 74. This compression or relaxation of elastomers 70 makes steering of front frame 80 about steering axis 84 easier or harder depending on compression of elastomers 70.

Figure 7A:
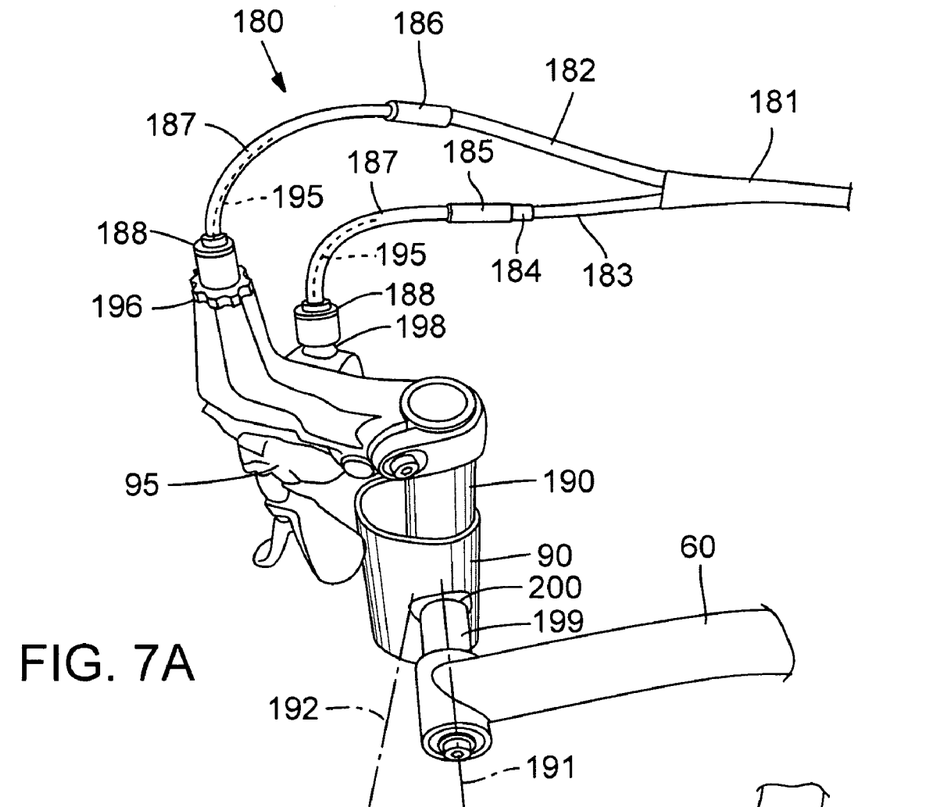
FIG. 7A View of the shift and brake cable attachment.
Figure 7B:
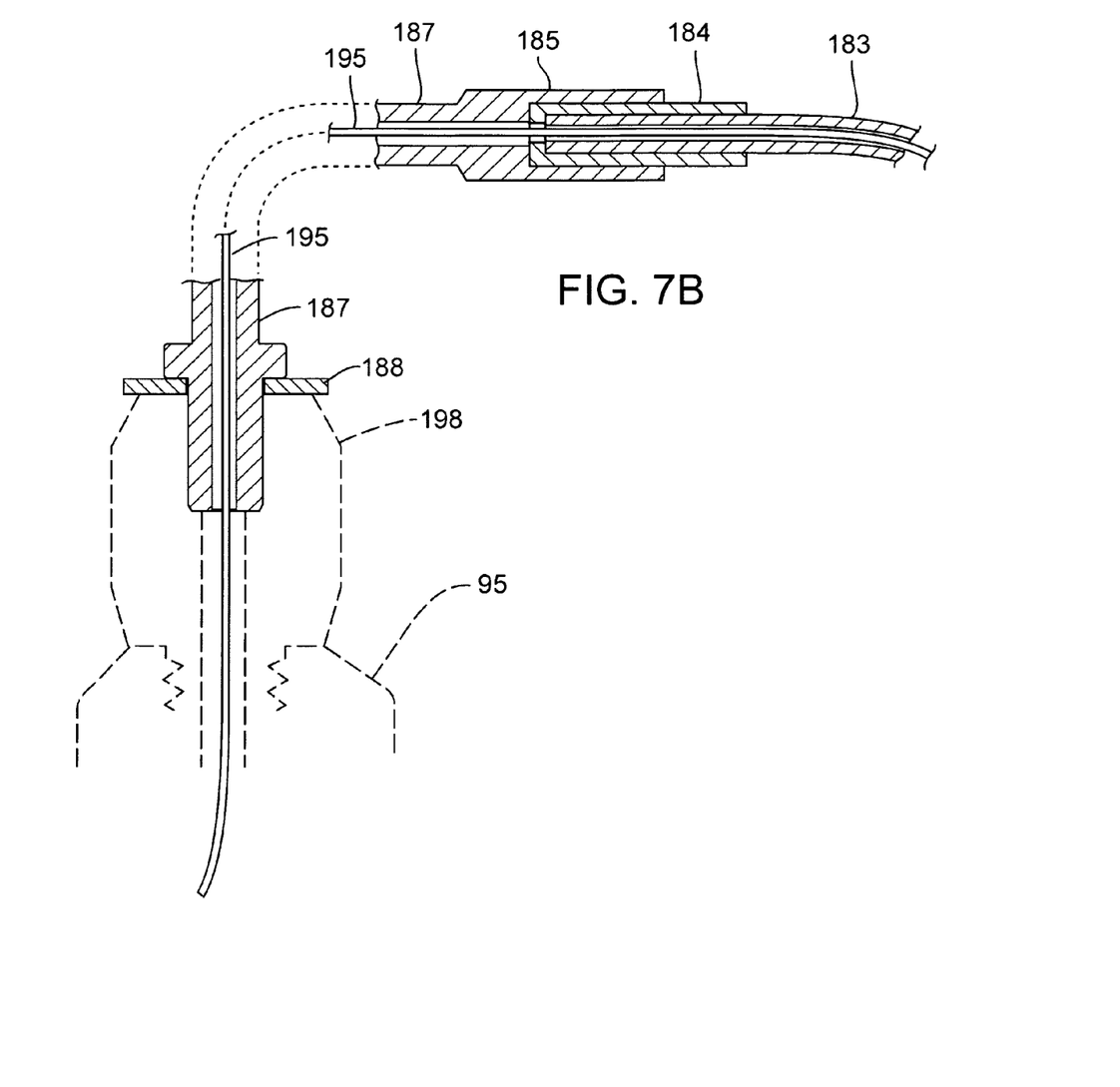
FIG. 7B Close up view of cable attachment to shifter and or brake lever.
Figure 8:
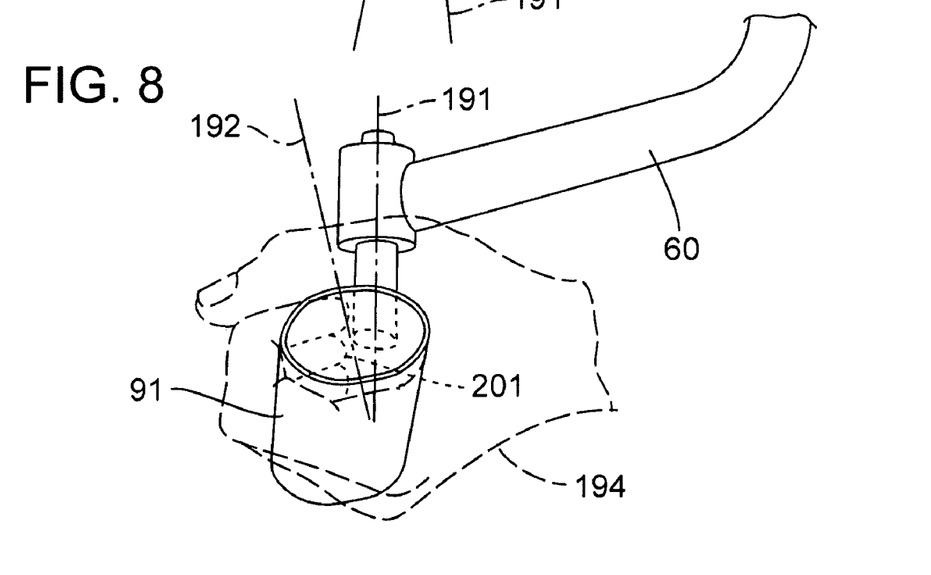
FIG. 8 View of pedal alignment and attachment.

Many handcycles are incorporating braking and shifting levers on the hand pedal of the handcycle. This application subjects the brake cable and shift cable along with their respective housings to flexing and bending and also twisting about their longitudinal axis often resulting in fraying of the cable housing or cable failure. In the present designs appearing on other's handcycles, the shift and brake cable housings protrude directly upward from the ends of the shift and brake levers and directly upward from the bottom bracket and/or crank spindle area of the handcycle forming roughly a "U" shape. Sometimes these cable housings have springs or additional tubing surrounding either end of the brake and shift cable housing near the interface with the shift and brake lever or at the bottom bracket to reinforce the cable housing. When the cable housing is attached in this manner the cable housing is forced upwards in front of the rider's field of view. Also, it is the tendency of the cable housing to resist bending and flexing as the cranks are pedaled. This resistance to flexing is transmitted through the cable housing and into the hand pedal through the shift and brake levers causing fatigue to the rider's wrists. The rotation of the cranks during pedaling force a constant twisting about the longitudinal axis of both the cable and cable housing. In the embodiment of our new design, we force the cable and cable housings into a spiral configuration between the shift and brake lever and the bottom bracket or crank spindle are FIG. 7A and FIG. 7B. 180. The spiral is created by forcing the distal ends of the cable housing and cable to be at approximately 90 degrees to each other. In the present embodiment of our invention the cable housing is forced upwards at the bottom bracket and forced rearward by device 180 at the brake and shift levers. The cables and housing 182 and 183 are attached to the brake and shift lever assembly 95 by means of an intermediate device 180 consisting of a member 187 bent at approximately 90 degrees, a thrust washer 188 and coupling spacer 184. This new device 180 directs the cable housings 182 and 183 rearwardly and horizontally toward the rider keeping the cable housings 182 and 183 out of the rider's field of view. Cable housings 182 and 183 are sheathed in protective sheath 181. Sheath 181 passes through guide 99, FIGS. 1, 1A and 2A. Guide 99 is a stiff guide that directs the cable housing sheath 181 rearwardly, upwardly and away from chain ring and sprocket guard 115 with the intent of keeping cable housing sheath 181 from contacting sprocket and sprocket guard 115. Device 180 in conjunction with the thrust washers 188 permits the cable housings 182 and 183 to rotate about the axis of the cable allowing the device 180 to move laterally back and forth as the pedals 90 and 91 come around. This motion minimizes the flexing of the cable housings 182 and 183 and eliminates the fatigue experienced by the rider's wrists 194. The brake cable 195 cooperatively passes through device 187 and engages braking of the handcycle. The brake cable housing 182 engages coupling 186 of device 180 then connects to device 187 into brake adjustment boss 196 which is attached to brake lever 95. Device 187 engages brake adjustment boss by means of thrust washer 188. Shift cable 195 cooperatively passes through cable housing 183, coupling device 184, coupling boss 185, and device 187 and engages shift lever 95. Device 187 engages thrust washer 188 and shift adjustment barrel 198. The shaft 199 pedal 90 is offset relative to attachment point 200 to permit clearance of rider's finger's 201. The pedals 90 and 91 rotate about axis 191 when the crank 90 is rotated. The pedal axis 192 is angled outwardly from axis 191 to permit proper orientation of the rider's wrist 194.

There are several other models of handcycles on the market today: Top End series, the Varna series, the Shark by Sopor, the Schmicking, and the Defiant. All of these handcycles and others on the market attempt to ergonomically place the rider for maximum comfort and power delivery. The present invention is different from each of these handcycles and from any other that presently exist.

The invention claimed is:

1. An apparatus comprising:
a front frame and rear frame;
a seat connected to said rear frame and configured to support the rider and;
a pair of wheels associated with said rear frame and;
a single front wheel positioned in association with said front frame and;
a pair of leg supports associated with the front frame at each side of said front wheel operatively engaged to support the rider's legs and;
said front wheel operatively engaged with the ground and;
a contact patch of the front wheel associated with the interface of the wheel and the ground and;
a coupling device operatively associated with said front and rear frame such that said front frame may pivot relative to said rear frame and;
a steering axis associated with said coupling device and;
said steering axis inclined upwardly and rearwardly from a point of intersection with the ground in front of said contact patch of said front wheel and the ground and;
said coupling device associated with said steering axis such that said coupling device is in close proximity to said front wheel and;
said coupling device located at or below a horizontal line between the axle of said front wheel and said rear wheels and;
said seat configured to support the rider located at or below a horizontal line between the axle of the front wheel and the axle of the rear wheels and;
said seat located in close proximity to said steering axis such that the operator's hip sockets are positioned close to said steering axis as measured from a distance perpendicular to said steering axis such that said pivoting of said front frame about said steering axis permits steering of said hand pedaled cycling device with minimal twisting of the operator's legs.

2. A hand pedaled apparatus comprising:
a front frame and rear frame;
a seat connected to said rear frame and configured to support the rider and;
a pair of wheels associated with said rear frame and;
a single front wheel positioned in association with said front frame and;
a pair of leg supports associated with said front frame at each side of said front wheel operatively engaged to support the rider's legs and;
said front wheel operatively engaged with the ground and;
a contact patch of the front wheel associated with the interface of the wheel and the ground and;
a coupling device operatively associated with said front and rear frame such that said front frame may pivot relative to said rear frame and;
a steering axis associated with said coupling device and;
said steering axis inclined upwardly and rearward from a point of intersection with the ground in front of said contact patch of said front wheel and the ground and;
a drive unit operatively engaged with said front wheel such that operation of the drive unit imparts rotation to said front wheel and;
a pair of crank arms operatively engaged with said drive unit such that rotation of said crank arms imparts rotation to the front wheel and;
a hand pedal associated with one end of each crank arm and operatively engaged with the operator's hand such that movement of the operator's hand imparts movement to said crank arms and;
a derailleur associated with said drive unit and;
a braking device associated with said front wheel and;
and at least one control device associated with each said hand pedal and operatively engaged with either said brake or said derailleur and;
a cable and cable housing associated with each said control device and operatively engaged with each said brake and derailleur and;
a device associated with said control device and operatively engaged with said cable and cable housing and configured such that said cable housing and cable is directed away from the field of view of the operator.

3. A hand pedaled apparatus comprising:
a front frame and rear frame;
a seat connected to said rear frame and configured to support the rider and;
a pair of wheels associated with said rear frame and;
a single front wheel positioned in association with said front frame and;
a pair of leg supports associated with the front frame at each side of said front wheel operatively engaged to support the rider's legs and;
said front wheel operatively engaged with the ground and;
a contact patch of the front wheel associated with the interface of the wheel and the ground and;
a coupling device operatively associated with said front and rear frame such that said front frame may pivot relative to said rear frame and;
a steering axis associated with said coupling device and;
said steering axis inclined upwardly and rearward from a point of intersection with the ground in front of said contact patch of said front wheel and the ground and;
a drive unit operatively engaged with said front wheel such that operation of the drive unit imparts rotation to said front wheel and;
a pair of crank arms operatively engaged with said drive unit such that rotation of said crank arms imparts rotation to the front wheel and;
a hand pedal associated with one end of each crank arm and operatively engaged with the operator's hand such that movement of the operator's hand imparts movement to said crank arms and;
a bearing assembly associated with said drive unit and operatively engaged with said pair of crank arms and;
a first frame member associated with said bearing assembly and configured to permit positioning of said bearing assembly in essentially a fore and aft direction relative to said front frame and;
a second frame member associated with said front frame and operatively engaged with said first frame member and configured to permit positioning of said bearing assembly in essentially an up and down direction relative to said front frame and;
a releasable locking means associated with said first frame member and said second frame member and operatively engaged with said first frame member and said second frame member such that once said bearing assembly is positioned said releasable locking means may be set in the locked position such that said bearing position and said cranks arms are located for access by the operator.

4. An apparatus comprising:

a front frame and rear frame;

a seat connected to said rear frame and configured to support the rider and;

a pair of wheels associated with said rear frame and;

a single front wheel positioned in association with said front frame and;

a pair of leg supports associated with said front frame at each side of said front wheel operatively engaged to support the rider's legs and;

said front wheel operatively engaged with the ground and;

a contact patch of the front wheel associated with the interface of the wheel and the ground and;

a coupling device operatively associated with said front and rear frame such that said front frame may pivot relative to said rear frame and;

a steering axis associated with said coupling device and;

said steering axis inclined upwardly and rearward from a point of intersection with the ground in front of said contact patch of said front wheel and the ground and;

a drive unit operatively engaged with said front wheel such that operation of the drive unit imparts rotation to said front wheel and;

a pair of crank arms operatively engaged with said drive unit such that rotation of said crank arms imparts rotation to the front wheel and;

a hand pedal associated with one end of each crank arm and operatively engaged with the operator's hand such that movement of the operator's hand imparts movement to said crank arms and;

a bearing assembly associated with said coupling device and;

a an axis associated with said bearing assembly and;

a removable shaft co-incident with said axis of said bearing assembly associated with said bearing assembly and operatively associated with said coupling device such that the removal of said shaft from said coupling device permits the removal of said front frame from the engagement with said rear frame.

5. An apparatus comprising:

a front frame and rear frame;

a seat connected to said rear frame and configured to support the rider and;

a pair of wheels associated with said rear frame and;

a single front wheel positioned in association with said front frame and;

a pair of leg supports associated with said front frame at each side of said front wheel operatively engaged to support the rider's legs and;

said front wheel operatively engaged with the ground and;

a contact patch of the front wheel associated with the interface of the wheel and the ground and;

a coupling device operatively associated with said front and rear frame such that said front frame may pivot relative to said rear frame and;

a steering axis associated with said coupling device and;

said steering axis inclined upwardly and rearward from a point of intersection with the ground in front of said contact patch of said front wheel and the ground and;

a drive unit operatively engaged with said front wheel such that operation of the drive unit imparts rotation to said front wheel and;

a pair of crank arms operatively engaged with said drive unit such that rotation of said crank arms imparts rotation to the front wheel and;

a hand pedal associated with one end of each crank arm and operatively engaged with the operator's hand such that movement of the operator's hand imparts movement to said crank arms and;

a back support associated with said rear frame and configured to be engaged by the operator's back and;

a first frame member associated with said seat back and;

a second frame member associated with said rear frame and operatively engaged with said first frame member and;

said first frame member comprised of a clevis associated with the lower distal end and;

a pivotal connection associated with said first frame member and said rear frame and operatively engaged with said clevis such that said first frame member may rotate about said pivotal connection and;

a releasable locking means associated with said clevis and;

a pair of brackets located essentially midway between distal ends of said first frame member and;

a slot associated with each of said brackets and;

a lug associated with the distal end of said second frame member and:

a releasable locking means associated with said lug and;

a slot associated with said lug and;

said second frame member telescopically associated with said rear frame and operatively engaged with said rear frame such that said back support may be positioned in a range of locations determined by the movements of said first and second frame members and said slots in said tabs and lug.

\* \* \* \* \*